(12) United States Patent
Semeniuk (10) Patent No.: US 12,215,720 B2
(45) Date of Patent: Feb. 4, 2025

(54) GASKET DEVICE AND PNEUMATIC VALVE SYSTEM FOR A COMMERCIAL VEHICLE

(71) Applicant: ZF CV SYSTEMS EUROPE BV, Brussels (BE)

(72) Inventor: Maciej Semeniuk, Wroclaw (PL)

(73) Assignee: ZF CV SYSTEMS EUROPE BV, Brussels (BE)

( * ) Notice: Subject to any disclaimer, the term of this patent is extended or adjusted under 35 U.S.C. 154(b) by 130 days.

(21) Appl. No.: 17/748,453

(22) Filed: May 19, 2022

(65) Prior Publication Data

US 2022/0372998 A1 Nov. 24, 2022

(30) Foreign Application Priority Data

May 19, 2021 (EP) ..................................... 21174623

(51) Int. Cl.
*F15B 13/02* (2006.01)
*F15B 15/20* (2006.01)
(Continued)

(52) U.S. Cl.
CPC ............ *F15B 13/02* (2013.01); *F15B 13/027* (2013.01); *F15B 15/20* (2013.01); *F16J 15/0818* (2013.01);
(Continued)

(58) Field of Classification Search
CPC ...... F15B 13/02; F15B 13/027; F15B 13/044; F15B 21/005; F15B 21/041; F15B 21/048; F16J 15/0818; F16J 15/106; F16K 15/145
See application file for complete search history.

(56) References Cited

U.S. PATENT DOCUMENTS

| 1,743,585 A | 8/1927 | Wiltse |
| 2,018,769 A | 10/1935 | Tryon |

(Continued)

FOREIGN PATENT DOCUMENTS

| DE | 102014019117 A1 | 6/2016 |
| WO | 2016124210 A1 | 8/2016 |

OTHER PUBLICATIONS

Machine assisted English translation of DE102014019117A1 obtained from https://patents.google.com/patent on May 17, 2022, 10 pages.

(Continued)

*Primary Examiner* — Craig M Schneider
*Assistant Examiner* — Christopher D Ballman
(74) *Attorney, Agent, or Firm* — Warner Norcross + Judd LLP (57) ABSTRACT

A gasket device for a pneumatic valve system, in particular of a commercial vehicle, comprises
gasket part being adapted to be inserted into at least a groove of a contact face of a first casing part, e.g. an adapter, the gasket part comprising at least one gasket chamber for sealingly connecting device channels of mounted casing parts;
a body part being adapted to be received in a valve seat of the casing part;
at least one spring part connecting the body part and the gasket part,
wherein the body part is moveable in an airflow direction relative to the gasket part by bending or stretching the at least one spring part,
wherein in an unbiased basic condition of the gasket device the body part is positioned above a gasket plane defined by the gasket chamber.
The gasket device is made as a single part of a flexible, elastic material.

10 Claims, 7 Drawing Sheets

(51) Int. Cl.
*F16J 15/08* (2006.01)
*F16K 27/08* (2006.01)
*F15B 13/044* (2006.01)
*F15B 21/00* (2006.01)
*F15B 21/041* (2019.01)
*F15B 21/048* (2019.01)

(52) U.S. Cl.
CPC .......... *F16K 27/08* (2013.01); *F15B 13/044* (2013.01); *F15B 21/005* (2013.01); *F15B 21/041* (2013.01); *F15B 21/048* (2013.01)

(56) References Cited

U.S. PATENT DOCUMENTS

| | | | | |
|---|---|---|---|---|
| 3,628,704 A * | 12/1971 | Corsette | ............ | B65D 51/1661 |
| | | | | 222/513 |
| 3,837,657 A * | 9/1974 | Farnam | ................ | F16J 15/123 |
| | | | | 277/654 |
| 4,167,200 A * | 9/1979 | Bouteille | ............... | F15B 13/04 |
| | | | | 137/884 |
| 4,557,290 A * | 12/1985 | Chanal | ................ | E21D 23/16 |
| | | | | 137/903 |
| 4,690,413 A * | 9/1987 | Adkins | ................ | B26F 3/002 |
| | | | | 206/223 |
| 5,084,324 A * | 1/1992 | Schirmer | ............ | B65D 81/03 |
| | | | | 428/137 |
| 5,086,803 A * | 2/1992 | Nakajima | ........... | F15B 13/0828 |
| | | | | 137/884 |
| 5,263,444 A * | 11/1993 | Prior | ................ | F02F 11/00 |
| | | | | 277/645 |
| 5,310,112 A * | 5/1994 | Meshberg | .......... | B05B 11/0072 |
| | | | | 222/212 |
| 5,345,969 A * | 9/1994 | Steele | ................ | F16K 15/144 |
| | | | | 137/853 |
| 5,722,456 A * | 3/1998 | Schumacher | ......... | B01D 29/05 |
| | | | | 137/550 |
| 5,829,560 A * | 11/1998 | Mainquist | ........... | F16H 61/0009 |
| | | | | 74/606 R |
| 6,098,597 A * | 8/2000 | Warmoth | ............. | F02M 59/105 |
| | | | | 123/447 |
| 6,173,966 B1 * | 1/2001 | Noble | ................ | F16J 15/121 |
| | | | | 277/596 |
| 6,374,803 B1 * | 4/2002 | Warmoth | ............. | F15B 21/041 |
| | | | | 123/447 |
| 6,641,142 B2 * | 11/2003 | Hegmann | ............. | F16J 15/062 |
| | | | | 277/594 |
| 7,032,564 B1 * | 4/2006 | Kryglowski | ............ | F01L 1/46 |
| | | | | 123/90.16 |
| 7,243,490 B2 * | 7/2007 | Yoshida | ................ | F02B 61/02 |
| | | | | 123/585 |
| 8,439,367 B2 * | 5/2013 | Jeanne | ................ | F16J 15/067 |
| | | | | 277/924 |
| 8,496,253 B2 * | 7/2013 | Goettler | ............... | F16J 15/0818 |
| | | | | 277/593 |
| 9,169,802 B2 * | 10/2015 | Schumacher | ........ | F16J 15/0818 |
| 9,296,457 B2 * | 3/2016 | Saruwatari | ......... | F01M 11/0004 |
| 9,746,078 B2 * | 8/2017 | Egloff | ................ | F16H 61/0009 |
| 9,835,246 B2 * | 12/2017 | Blersch | ................ | F16J 15/02 |
| 10,371,160 B2 * | 8/2019 | Aihara | ................ | F04B 39/00 |
| 2005/0134008 A1 * | 6/2005 | Salameh | ................ | F16J 15/062 |
| | | | | 277/628 |
| 2005/0269788 A1 * | 12/2005 | Grunfeld | ................ | F16J 15/127 |
| | | | | 277/592 |
| 2007/0107711 A1 * | 5/2007 | Leal | ........................ | F41B 11/68 |
| | | | | 124/71 |
| 2010/0007095 A1 * | 1/2010 | Klinner | ................ | F02F 11/002 |
| | | | | 277/592 |
| 2010/0166965 A1 * | 7/2010 | Salameh | ........... | B29C 45/14016 |
| | | | | 427/372.2 |
| 2010/0187771 A1 * | 7/2010 | Waltenberg | ......... | F01N 13/1827 |
| | | | | 277/596 |
| 2010/0253012 A1 * | 10/2010 | Zhuang | ................ | F16J 15/108 |
| | | | | 277/637 |
| 2011/0095491 A1 * | 4/2011 | Stecher | ................ | F16J 15/0818 |
| | | | | 72/46 |
| 2019/0093680 A1 * | 3/2019 | Kidokoro | .............. | F15B 21/005 |
| 2020/0408303 A1 * | 12/2020 | Gruhler | ................ | F16J 15/0818 |

OTHER PUBLICATIONS

Machine assisted English translation of WO2016124210A1 obtained from https://patents.google.com/patent on May 17, 2022, 9 pages.

* cited by examiner

Prior Art

GASKET DEVICE AND PNEUMATIC VALVE SYSTEM FOR A COMMERCIAL VEHICLE

CROSS-REFERENCE TO RELATED APPLICATIONS

This application claims priority to and all advantages of European Patent Application No. 21174623.5, filed on 19 May 2021, the contents of which are hereby incorporated by reference.

FIELD OF THE INVENTION

The invention relates to a gasket device for use in a pneumatic valve system, and a pneumatic valve system comprising such a gasket device. The pneumatic valve system is preferably a pneumatic supply system or part of a pneumatic supply system, of a commercial vehicle.

BACKGROUND OF THE INVENTION

In a pneumatic device which comprises two or more casing parts, the casing parts are in general connected to each other at corresponding contact faces, in particular flat flange faces. In general the connection between the casing parts is sealed by a gasket in order to enable an air flow between channels of the casing parts. The gasket is preferably made of a rubber material or plastic material and can be inserted into a groove or groove system at one of the contact faces. The casing parts are then mounted onto each other and e.g. fixed by screws or bolts, thereby pressing the gasket between the casing parts. Thus the gasket provides a reliable air tightening of the air flow channels between the casing parts without leakage.

Furthermore, pneumatic devices often comprise different valve parts. One of these valve parts is a check valve or non-return valve for allowing an air flow in an air flow direction and blocking the reverse air flow. The check valve or non-return valve in general comprises a valve seat, a valve body, in particular a valve ball, and a spring for biasing the valve body against the valve seat. The check valve can be positioned between two mating casing parts, for example by supporting the valve spring on a first casing part and realizing the valve seat on the other casing part.

Air supply systems of commercial vehicles in general comprise inlet ports to be connected to a compressor outlet, outlet ports for air consumer circuits, in particular brake circuits, a desiccant cartridge for drying the compressed air supplied by the compressor, and solenoid valves. The solenoid valves are provided for switching between supply phases and regeneration phases for regenerating the desiccant cartridge. In general at least one check valve is provided for blocking an air flow during one of the phases.

U.S. Pat. No. 2,018,769 A discloses improvements in valve structures of valves of the ball type. A ball valve assembly comprises a housing flanged at both its inlet and outlet ends, enlarged and flanged at the middle. The middle flange compresses a rim of a slotted spider, wherein the spider comprises a hollow frustum of a cone converging upstream from its base and terminating in a seat. The spherical ball is made of a suitable alloy steel and disposed within a valve housing. A downstream seat is provided for the ball upon flow of fluid downstream through the housing. The seat is formed by a spider extending transversely across the housing and the base, wherein the spider is clamped between the sections of the housing. Further, a gasket made of a soft material such as asbestos is disposed between a base part and a further part.

U.S. Pat. No. 1,743,585 A describes a gasket to be used in an oil and fuel pump. The pump comprises a casing provided with an upwardly extending part serving as a guiding and supporting means, which realizes a duct between an inlet and outlet port. Further, a sheet of fibre is provided between a casing and a cap closing an open end of the casing, wherein the sheet comprises an opening connecting said duct with ports. Furthermore, a valve element is provided for cooperating with one of several openings. The fibre is formed to provide a seat for said valve element.

Those device systems in general provide a sealing function by means of a gasket, and further a check valve function by means of additional parts. However, such a device is complex, and assembling the device with these elements is time-consuming.

Therefore it is an object of the invention to realize a gasket device and a pneumatic valve system for use in a commercial vehicle which enable a reliable functionality at low costs and time efficient assembling.

BRIEF SUMMARY OF THE INVENTION

This object is realized by a gasket device and a pneumatic valve system according to the invention.

Thus the gasket device comprises a gasket part for realizing the functionality of a gasket, which is to provide a sealing function between two casing parts mounted together. The gasket part defines at least one, preferably two or more gasket chambers for enabling a sealed connection of air flow channels of the connected casing parts.

Further, the gasket device comprises a valve insert of a check valve, which valve insert comprises a body part, preferably formed as a ball part, to be pressed against a valve seat, and at least one spring part for biasing said body part and connecting it to the gasket part.

The gasket device is made as a single part, preferably of rubber or a plastic material, in particular only of a single material like rubber or plastic.

Thus manufacturing the gasket device is relatively cheap, and the assembling time for mounting the casing parts together with a gasket device in-between is relatively short.

By realizing the check valve function by the gasket device, no further elements or additional means are necessary. The body part is already realized in the gasket device, and further the spring function or biasing force is already realized by the gasket device.

In the unbiased, untensioned basic condition of the gasket device the spring part preferably supports the body part at a position above a gasket plane defined by the gasket part.

Inserting the gasket part into grooves of a casing part provides a more stable bearing function or support function for the valve insert, i.e. the spring parts and the body part, than providing additional support elements.

When the gasket device is inserted into the grooves of a casing part, e.g. an adapter, the body part contacts the valve seat of the casing part and is hereinafter displaced against the elastic force of the spring parts. Thus the spring parts already provide an elastic biasing force for pressing the body part against the valve seat, thereby closing the check valve.

The body part and the valve seat preferably realize a blocking function for blocking a reverse air flow. Thus both functions, the gasket sealing function as well as the check valve function, can be realized by a single part, in a surprisingly simple manner.

The body part can comprise an at least partially spherical form, for realizing a typical ball valve. Further, other body part forms are possible, for example a conical form, a flat form or a lip form. Those forms can easily be realized by forming the material of the gasket device during the manufacturing process.

Preferably more than one spring part is provided. Preferably at least two, in particular three spring parts are provided, thereby realizing a kind of spider supporting the body part. Such an arrangement of two or three, possibly four spring parts enable a symmetrical support of the body part, and a biasing direction perpendicular to the gasket plane.

The cross section of the spring parts and the body part does not impede the air flow through the gasket chamber provided with the check valve function.

The displacement distance of the body part and the spring force or biasing force can easily be adjusted by the form and number of the spring parts. Thus the form, cross section and number of the spring parts can be designed for the specific valve properties, without the use of further elements.

According to a preferred embodiment the gasket device comprises several gasket chambers, for connecting several air flow chambers of the adjacent, connected casing parts. The check valve function therefore is realized in at least one of the gasket chambers, without influencing the other gasket chambers. Thus a complex gasket comprising several gasket chambers with a relevant number of check valves can be realized.

The gasket part is preferably made as a net of sealing lines or gasket lines to be inserted into grooves of the casing part. The cross section of the sealing line comprises a part inserted into the groove, and preferably a protrusion protruding from the contact face or flange face of the first casing part, in order to be pressed against the contact face of the other casing part, for ensuring a reliable seating function.

According to a further aspect of the invention a pneumatic valve system is provided comprising two casing parts and a gasket device according to the invention between them. Thus several air flow connections between the two casing parts can be realized and sealed by gasket chambers of the gasket device; further, one or more of the air flow connections can be provided with a check valve function, in particular a non-return valve function, without any further means. Preferably only the casing parts, the gasket device and screws for fixing them are necessary.

According to an aspect of the invention a pneumatic valve system, in particular a pneumatic air supply system of a commercial vehicle, is provided. The gasket device is preferably provided for connecting a valve housing of two solenoid valves with an adapter, in particular an adapter for receiving pneumatic lines. The two solenoid valves, in particular a compressor valve and a regeneration valve, are switched between at least a supply phase and a regeneration phase, wherein the check valve function of the gasket device is used for switching between different air flow directions in these phases.

BRIEF DESCRIPTION OF THE DRAWINGS

The invention is hereinafter described in detail with reference to the appended drawings, in which.

DETAILED DESCRIPTION

Figure 13:
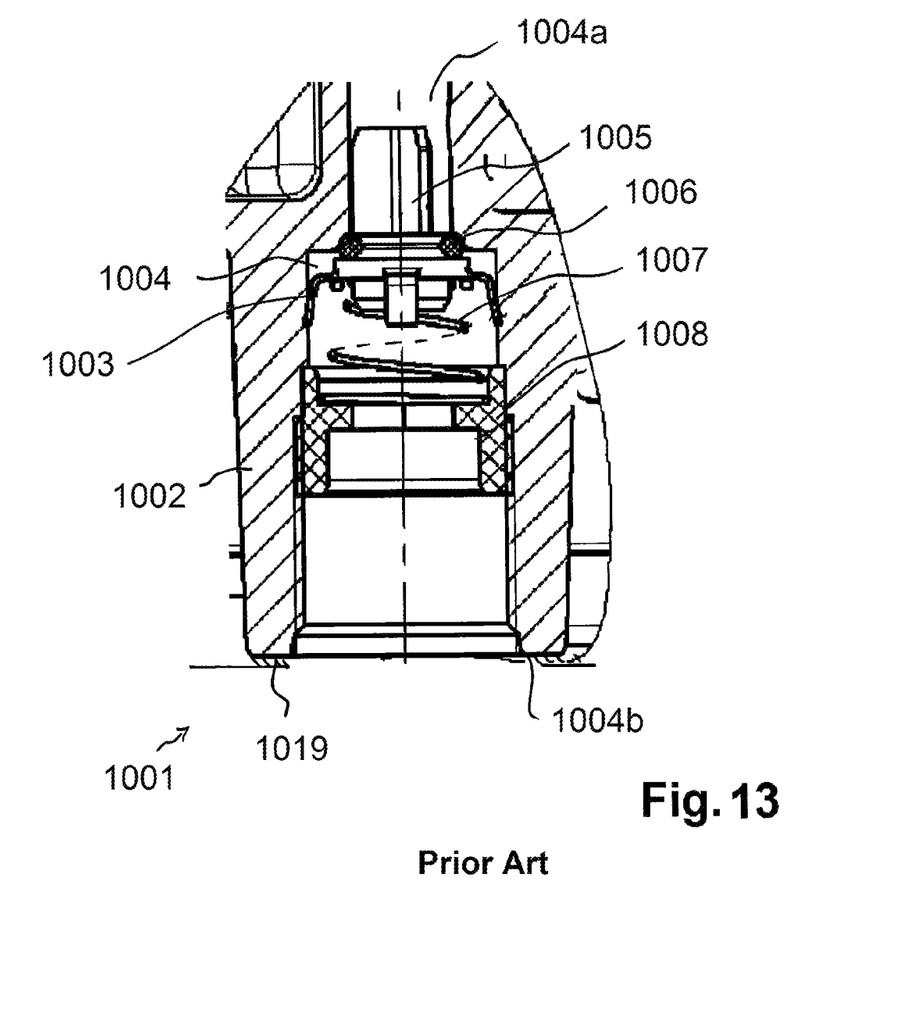
FIG. 13 shows a pneumatic valve system according to the prior art.

FIG. 13 shows a pneumatic valve system 1001 with a casing 1002, a check valve 1003, and an air flow channel 1004. The check valve 1003 is inserted into the air flow channel 1004, thereby defining an air inlet 1004a and an air outlet 1004b in the air flow channel 1004. The check valve 1003 allows an air flow from the air inlet 1004a to the air outlet 1004b and blocks an inverse air flow. Therefore the check valve 1003 comprises a valve body 1005, a valve seat 1006, a spring 1007 for pressing the valve body 1005 against the valve seat 1006, and in general a valve insert 1008, which serves as an end support for the spring 1007 and is inserted into the air flow channel 1004. Those check valves 1003 are reliable for controlling the air flow; however, the assembly comprises several parts. Further, when assembling the check valve 1003 the casing 1002 is mounted onto a further casing part with an additional gasket 1019 for sealing the air flow channels.

Figure 1:
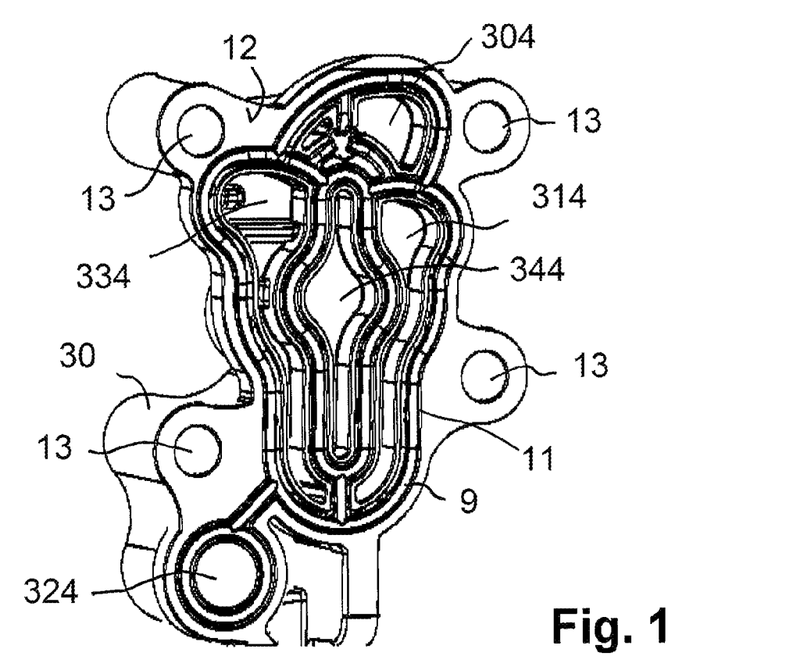
FIG. 1 shows a perspective front view of an adapter with air flow chambers and a gasket device according to an embodiment of the invention.

FIGS. 1 to 3 and 10 to 12 depict parts of a pneumatic valve system 1 according to an embodiment of the invention, with an adapter 30 and a gasket device 9 being inserted into a flange face 12 of the adapter 30, wherein the flange face 12 is located at the front face 30b of the adapter visible in FIG. 1.

Figure 10:
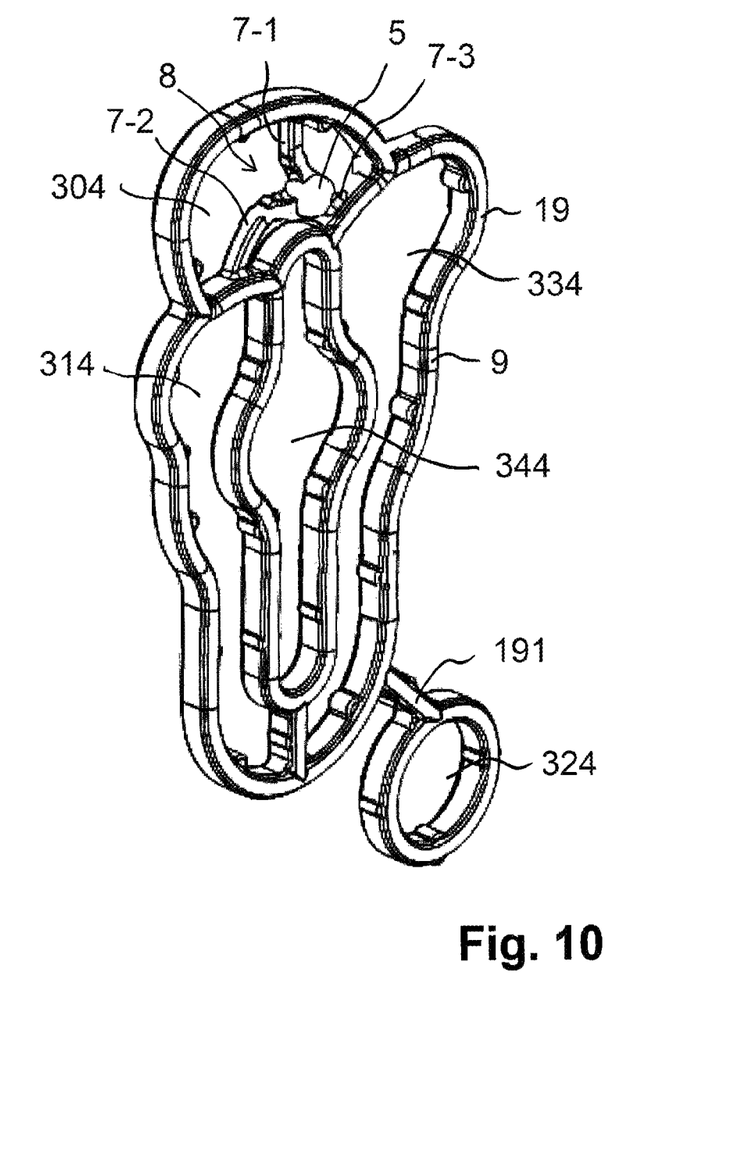
FIG. 10 shows a perspective back view of the gasket device according to the embodiment of FIG. 1, 2.

The adapter 30 comprises several air flow channels 104, 114, 124, 114a, 114b at its flange face; the gasket device 9 shown in FIG. 10 is inserted into the flange face 12 and comprises corresponding gasket channels 304, 314, 324, 334, 344 fitting to the respective air flow channels 104, 114, 124, 114a, 114b of the of the adapter 30.

Figure 2:
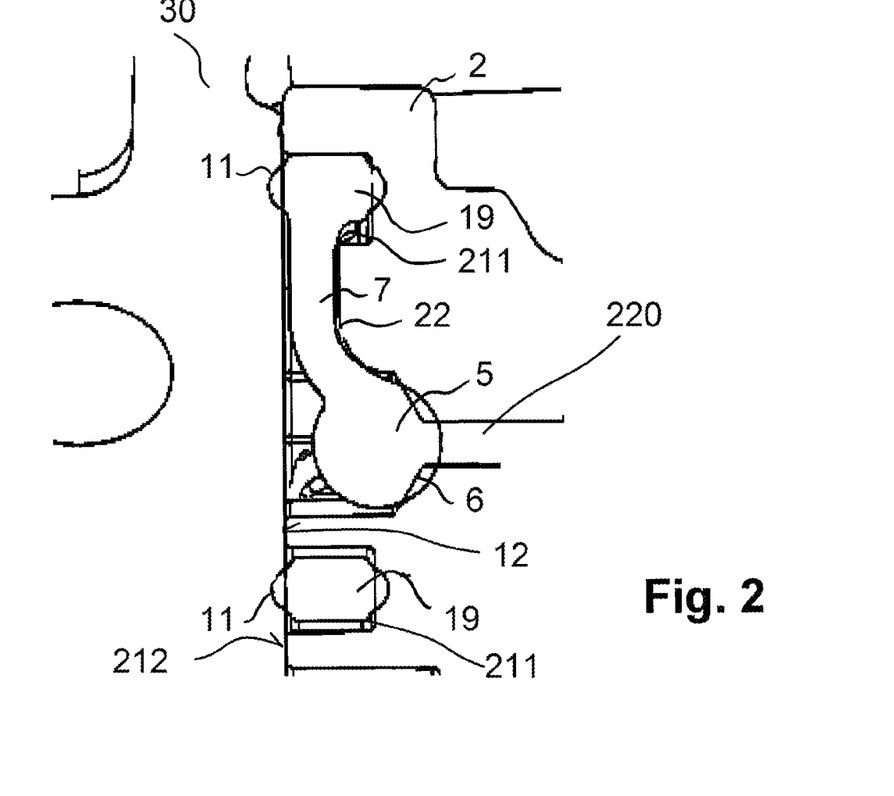
FIG. 2 shows an enlarged sectional view of FIG. 1.
Figure 12:
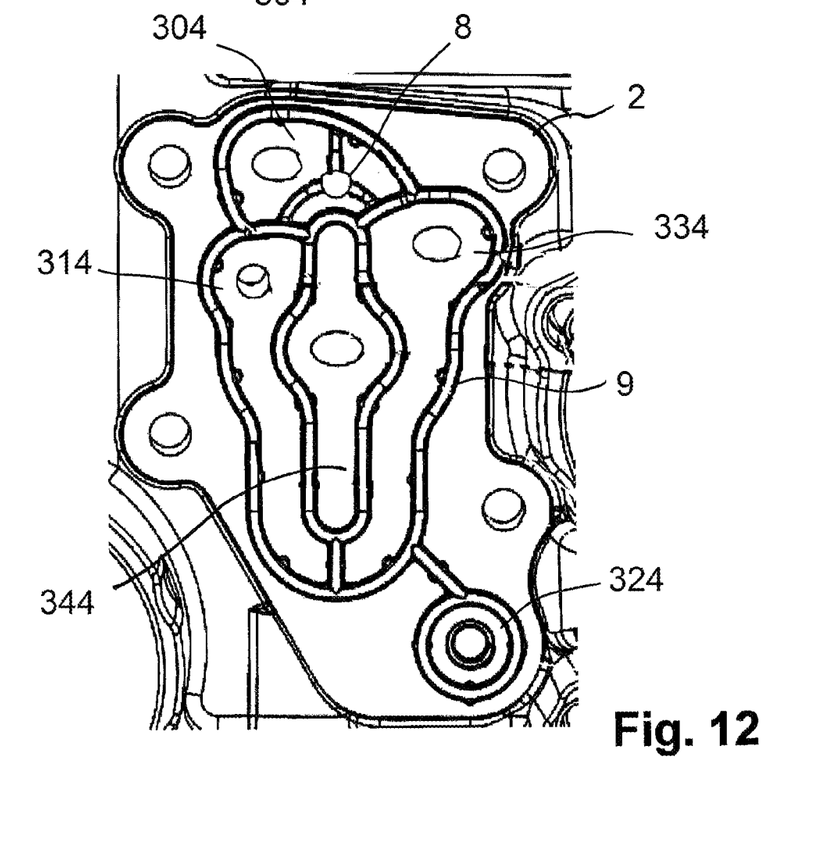
FIG. 12 shows a back view of the the gasket device, provided on the second casing part.

Thus the adapter 30 constitutes a first casing part. A second casing part 2, which is shown in FIGS. 2 and 12, is mounted onto the front face 30b of the adapter 30, and the gasket device 9 is provided between the casing parts 30, 2 and seals the air connections between the casing parts 30, 2 by its gasket chambers 304, 314, 324, 334, and 344, which are explained more in detail below.

Figure 3:
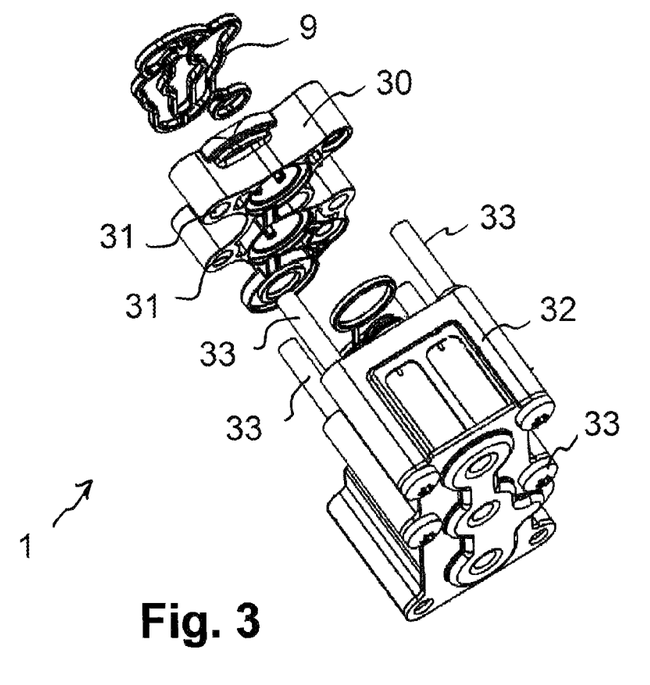
FIG. 3 shows an exploded view of a pneumatic valve system according to an embodiment of the invention with a check valve.

Further, a third casing part 32, which preferably is a solenoid casing part, is connected to the back face 30a of the adapter 30, as can be seen from FIG. 3. The assembly of the casing parts, i.e. the adapter 30, the second casing part 2 and the third casing part 32, is fixed by screws 33 inserted into screw holes 13 provided in the adapter 30.

Figure 11:
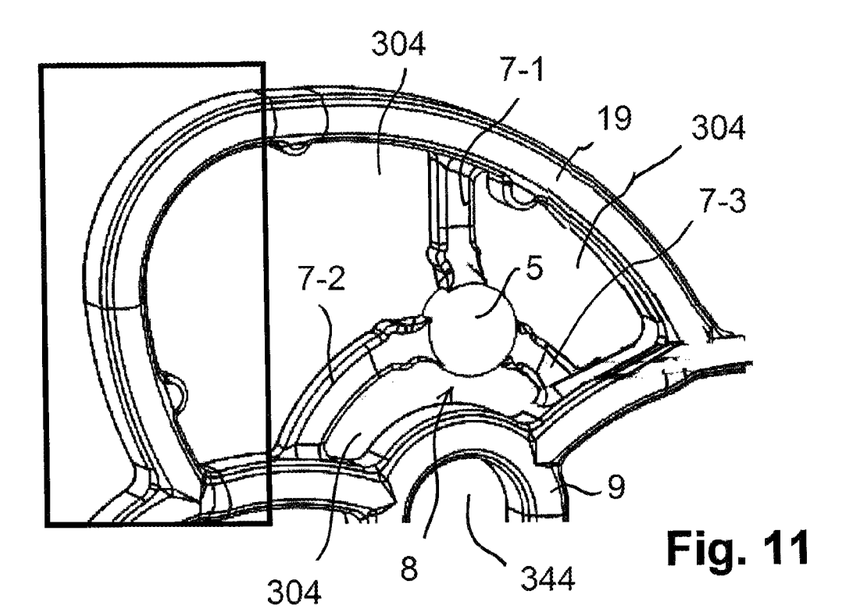
FIG. 11 shows an enlarged detail of FIG. 10.

FIGS. 10 and 11 depict the gasket device 9 in its unbiased, untensioned basic condition. Further, FIG. 2 shows a cross-section of the adapter 30 and the inserted gasket device 9; thus in FIG. 2, the gasket device 9 is in its mounted condition, in which it is unbiased or pre-loaded. The gasket device 9 is realized as a single part, preferably made of rubber or a plastic material, preferably without further inserts of e. g. metal. The gasket device 9 includes a gasket part 19 serving as a gasket, three spring parts 7-1, 7-2, 7-3 serving as a valve spring, and a valve body part 5 serving as a valve body, in particular as a valve ball. Thus the gasket device 9 comprises an integrated check valve function. An additional valve insert, which in conventional check valves includes the movable parts of a valve, i.e. the valve body and the spring, is not necessary; the function of the conventional valve insert is already realized by the three spring parts 7-1, 7-2, 7-3 and the valve body part 5.

The adapter 30 comprises a flange face 12 with grooves 11 for receiving the gasket part 19 of the gasket device 9. The three spring parts 7-1, 7-2, 7-3 and the valve body part 5, which correspond to a conventional valve insert, form a spider 8 (a spider-like feature), thereby supporting the valve body part 5 above a gasket plane defined by the gasket part 19. In the mounted condition, the body part 5 is pressed against a conical valve seat 6 of the casing 2, see FIG. 2. Thus the body part 5 is biased by the spring force of the spring parts 7 into its closing direction.

According to FIG. 2 the spring part 7, which can be each of the three spring parts 7-1, 7-2, 7-3, have a smaller cross-section than the body part 5, which is preferably spherical in order to serve a valve ball. However, other forms of the body part 5 are possible for interacting with the corresponding valve seat 6 of the second casing part 2. The gasket part 19 is inserted in grooves 11 of the adapter 30 and corresponding grooves 211 of the second casing part 2. The second casing part 2 comprises at least one second air flow channel 220.

When mounting the second casing part onto the flange face (contact face) 12 of the adapter 30, the gasket part 19 of the gasket device 9 is pressed into the grooves 211 of the second casing part 2, thereby ensuring the seating function.

FIG. 3 shows an exploded view of a pneumatic device, with the adapter 30, a gasket device 9 according to an embodiment, and a third casing part 32, in particular a solenoid casing part housing solenoid valves. This assembly is fixed by screws 33 inserted in screw holes of the third casing part 32 and screw holes 31 of the adapter 30.

Figures 4, 6:
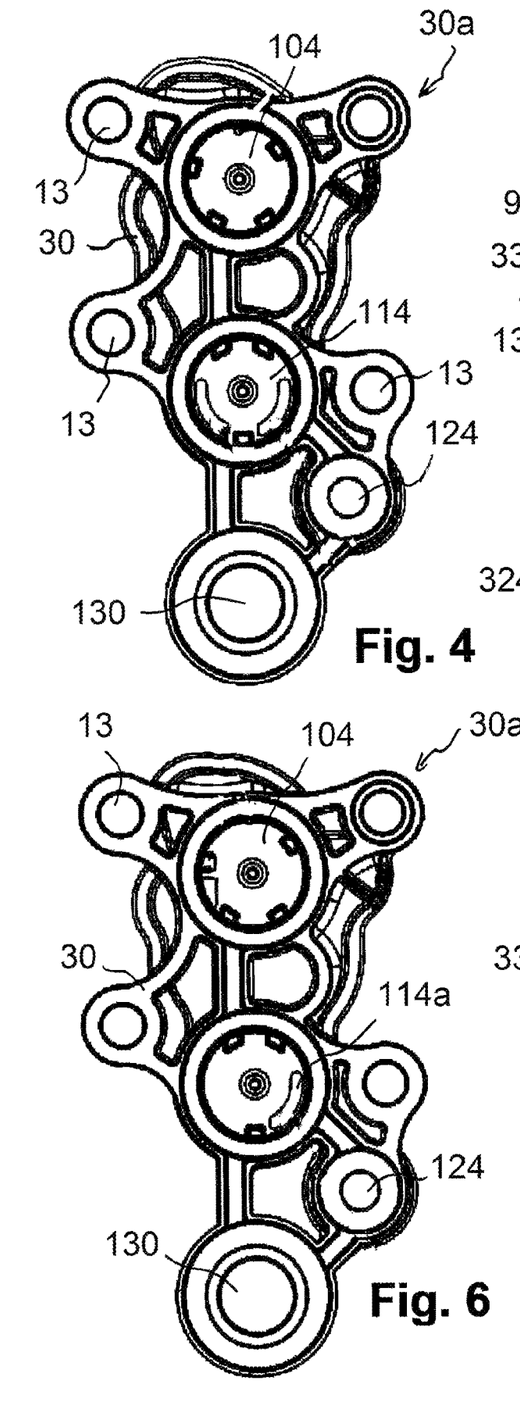
FIG. 4 shows a back view of an adapter according to a first embodiment with one compressor outlet channel.
FIG. 6 shows a back view of an adapter according to a second embodiment with two compressor outlet channels.
Figure 5:
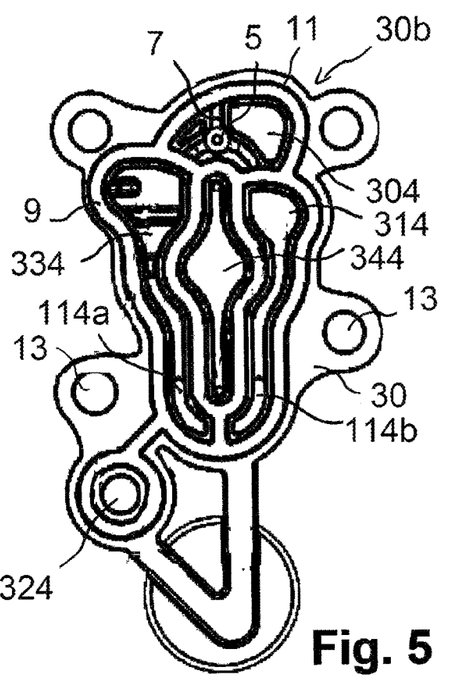
FIG. 5 shows a front view of the adapter of FIG. 4 with inserted gasket device, corresponding to FIG. 1.

FIGS. 4 and 5 show a first embodiment of the adapter 30.

FIG. 4 shows the back face 30a of the adapter 30, which back face 30a is connected to the third casing part 32. The back face 30a comprises a regeneration channel 104 to be connected to a solenoid outlet of the third casing part 32, a compressor channel 114, and an exhaust channel 124. The back face 30a of the adapter 30 can further comprise a dead end connection 130, which is not in connection with a conduct or opening on its front face 30b. The air channels 104, 114, 124 of the back face 30a are connected to air channels 104, 114a, 114b 124 on the front face 30b of the adapter 30; thus the channel arrangements of the front face 30b and the back face 30a can differ.

FIG. 5 shows the front face 30b of the adapter 30, which comprises grooves 11, in which the gasket device 9 is received. Thus the front face 30b of the adapter 30 is covered by the gasket device 9 comprising the gasket chambers 304, 314, 344, 324 and 334. The air flow chamber arrangement of the front face 30b of the adapter 30 corresponds to the topology of the gasket device 9, as already described with reference to FIG. 1.

In this embodiment of FIGS. 4 and 5, the compressor channel 114 of the back face 30a is connected to a first compressor channel 114a and a second compressor channel 114b of the front face 30b, wherein the first compressor channel 114a is sealed by the gasket chamber 334 and the second compressor channel 114b is sealed by the gasket chamber 314.

Thus the compressor channels 114a, 114b are in parallel connected to a compressor outlet of the third casing part 32.

Figure 7:
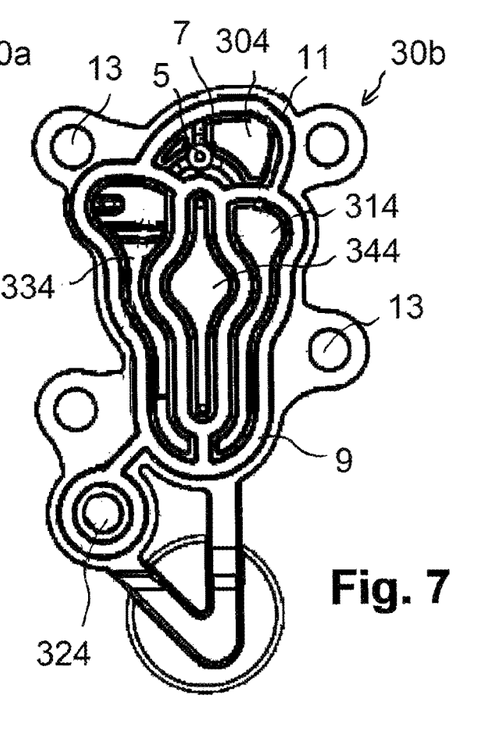
FIG. 7 shows a front view of the adapter of FIG. 6 with inserted gasket device.

FIGS. 6 and 7 show a further embodiment of the adapter 30, which in general corresponds to the embodiment of FIGS. 4 and 5; however, only a first compressor channel 114a is provided on the front face of FIG. 7, in order to supply only one air channel, for example a pneumatic brake channel, with compressed air.

Thus the invention offers the possibility to realize different types of adapters, and a different number of air flow channels and supplied pneumatic circuits.

FIGS. 10 and 11 show more details of the gasket device 9 which can be used in both embodiments of FIG. 4, 5 as well as FIG. 6, 7.

Thus the gasket device 9 can be made with low costs and comprises different gasket chambers 304, 314, 344, 324 and 334, for sealing the corresponding channels 104, 114a, 114b, 124 of the adapter 30 and the corresponding connecting face of the second casing part 2.

The gasket device 9 of FIGS. 4 to 7 in particular comprises a regeneration gasket chamber 304, a solenoid inlet chamber 344, which is positioned in the central part of the gasket device 9, a first compressor solenoid outlet chamber 314 and a second compressor solenoid outlet chamber 334, and an exhaust chamber 324. The spider 8 comprised of three spring parts 7-1, 7-2, 7-3 and the body part (ball part) 5 realizes the check valve function or non-return valve function between the chambers connected by the regenerator gasket chamber 304. Thus the body part 5 comes into contact with the valve seat 6 provided in the second casing part 2.

The amount, form and cross section of spring parts 7-1, 7-2 and 7-3 is design-specific in order to provide the required valve functionality, depending on the air flow conditions.

FIG. 12 therefore depicts the position of the body channels or casing channels relative to the gasket chambers. Thus the body channels provided for different air flow functions are surrounded by the respective gasket chambers. As can be seen from FIG. 12 and FIG. 1, both casing parts to be connected by the gasket device 9 comprise a flange face: the adapter 30 comprises the flange face 12, and the other casing part 2 comprises a corresponding, mating flange face to be connected with the flange face 12, with the gasket device 9 being between them and being pressed by them. Further both flange faces comprise screw holes to be fixed by screws 33.

Figure 8:
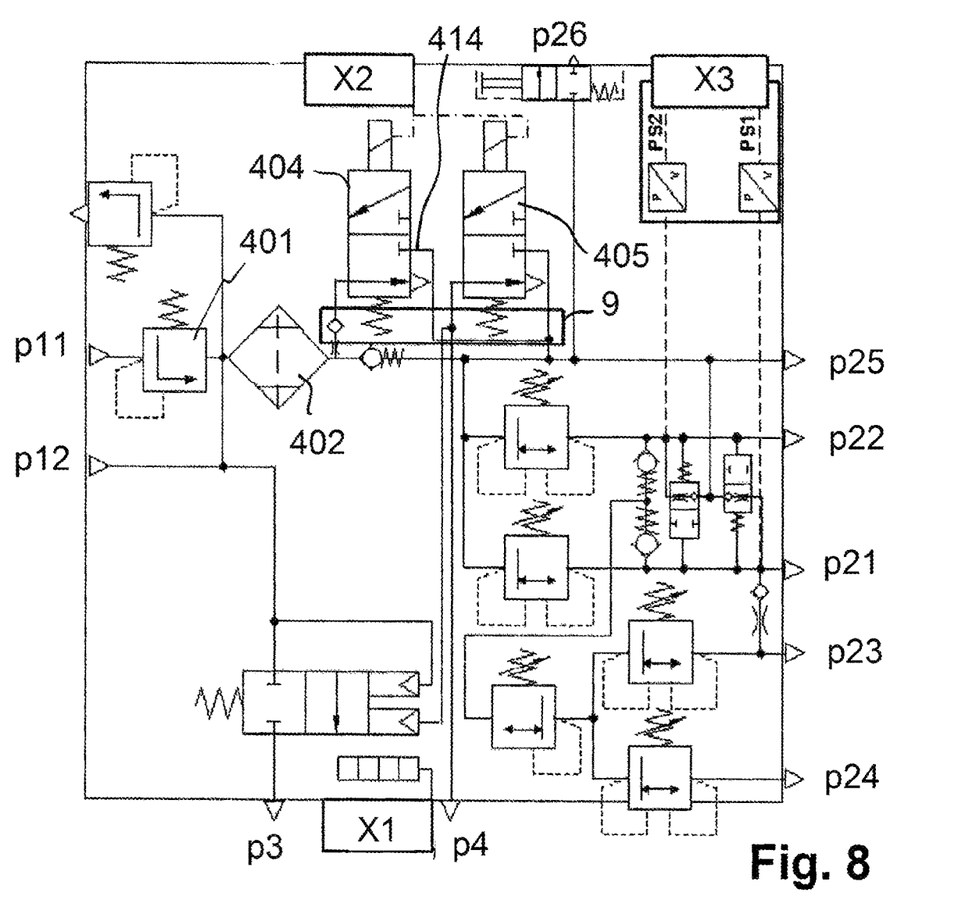
FIG. 8 shows a pneumatic scheme of an air supply system for use in a pneumatic system of a commercial vehicle.

FIG. 8 shows a pneumatic scheme of an air supply system, in particular comprising inlet ports p11, p12 and outlet ports p21, p22, p23, p24, p25, p26, p3, p4. A compressor is connected with its compressor outlet to the compressor inlet port p11 and via an air flow valve 401 and a filter 402 to the solenoid valves 404, 405, which in particular are provided as regeneration valve and compressor valve, for switching between a supply phase, in which the compressor supplies pressurized air to the outlet ports p21, p22, p23, p24 and p25, and regeneration phase for regenerating the filter 402. The filter 402 preferably comprises one or two desiccant cartridges, which are regenerated in the regeneration phases.

The outlet port p21 to p25 are provided for supplying air consumption circuits with pressurized air; these air consumption circuits are in particular brake circuits, a trailer brake circuit and/or further pneumatic consumer circuits.

Figure 9:
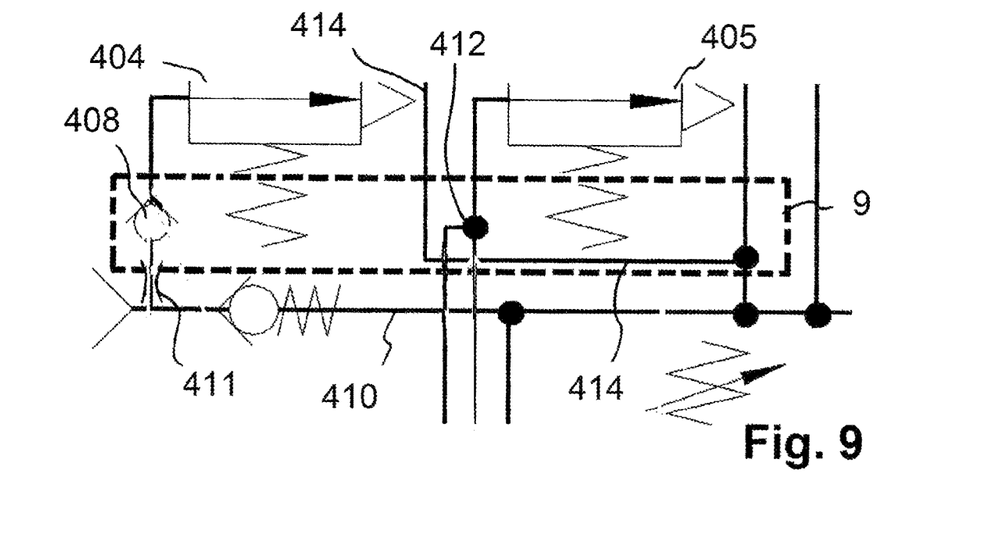
FIG. 9 shows an enlarged detail of FIG. 8 representing a gasket device or check valve device according to an embodiment.

FIG. 9 shows an enlarged view of the scheme of FIG. 8, with an assembly to be realized by the inventive gasket device 9. Thus the gasket device 9 realizes the function of the check valve 408 and the sealing function or gasket function between the solenoid valves 404, 405 and a casing with a supply line 410. According to invention the gasket device 9 can combine the function of one or more check valves and the sealing function or gasket function to one or more valves to be connected.

According to FIG. 9 the check valve 408 is provided between the regeneration solenoid outlet 404a of the regeneration solenoid valve 404. Further a throttle 411 connected to the regeneration solenoid outlet and the check valve 408 can be realized by the gasket device 9.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

LIST OF REFERENCE NUMERALS (PART OF THE DESCRIPTION)

1 pneumatic valve system, pneumatic valve device
2 second casing part
3 check valve
4 air flow channel
4a inlet of the air flow channel
4b outlet of the air flow channel
5 body part
6 conical valve seat
7 spring part
8 spider, movable part of the gasket device
9 gasket device
11 grooves in the adapter 30
12 flange face (contact face) of the adapter 30
13 screw hole
14, 24, 34, 44 air flow chamber
19 gasket part
22 recess in the adapter 30
30 adapter (first casing part)
30a back face of adapter 30
30b front face of adapter 30
33 screws
34 pneumatic supply device
104 regeneration channel of the adapter 30
114 compressor channel of the adapter 30
114a, 114b first and second compressor channel
124 solenoid exhaust channel of the adapter 30
130 dead end connection, of the adapter 30
211 grooves in the second casing part 2
212 second flange face, in the second casing part 2
220 second air flow channel in the second casing part 2,
304, 314, 324, 334, 344 gasket chambers:
304 regeneration gasket chamber
314 first compressor solenoid outlet chamber
324 exhaust chamber
334 second compressor solenoid outlet chamber
344 solenoid inlet chamber
404 regeneration solenoid valve
405 compressor solenoid valve
401 over flow valve
402 filter, comprising a desiccant cartridge
404a regeneration solenoid outlet
412 compressor solenoid outlets
414 solenoid inlet
1001 pneumatic valve system (prior art)
1002 casing part (prior art)
1003 check valve (prior art)
1004 air flow channel (prior art)
1004a inlet of the air flow channel (prior art)
1004b outlet of the air flow channel (prior art)
1005 valve body (prior art)
1006 valve seat (prior art)
1007 spring (prior art)
1008 valve insert (prior art)
1019 gasket (prior art)
p3 outlet port
p11 compressor inlet ports, to be connected to a compressor
p12 inlet port
p21 consumer circuit outlet
p22 consumer circuit outlet
p23 consumer circuit outlet p24 consumer circuit outlet
p25 consumer circuit outlet
p26 consumer circuit outlet

What is claimed is:

1. A gasket device for a pneumatic valve system, said gasket device comprising:
 a gasket part being adapted to be inserted into at least a groove of a flange face of a first casing part,
 at least one gasket chamber for sealingly connecting channels of a mounted second casing part, the at least one gasket chamber being defined by the gasket part,
 a body part being adapted to be received in a valve seat of said second casing part, and
 three spring parts connecting said body part and said gasket part,
 wherein said body part is moveable in an airflow direction relative to said gasket part by bending or stretching said spring parts,
 wherein in an unbiased basic condition of said gasket device said body part is positioned above a gasket plane defined by said gasket chamber,
 said spring parts extending from said gasket part in a symmetrical arrangement, thereby forming a spider for supporting said body part above said gasket part, in said unbiased basic condition of said gasket device
 wherein said gasket device is made as a single part of a flexible, elastic material.

2. The gasket device according to claim 1, wherein said gasket device is made of rubber or a plastic material.

3. The gasket device according to claim 1, wherein said body part comprises a contact face for contacting said valve seat, which contact face comprises one of the following forms:
 at least partially spherical,
 at least partially conical,
 at least partially flat, or
 at least partially in form of a lip.

4. The gasket device according to claim 1, wherein said spring part comprises a smaller cross-section than said body part and/or said gasket part.

5. The gasket device according to claim 1, wherein
 said gasket part forms a net of at least two gasket chambers, each of said gasket chambers being provided for sealingly connecting two adjacent air flow channels of said mounted casing parts.

6. A pneumatic valve system, for a use in commercial vehicle, said pneumatic valve system comprising:
 a gasket device comprising:
  a gasket part being adapted to be inserted into at least a groove of a flange face of a first casing part,
  at least one gasket chamber for sealingly connecting channels of a mounted second casing part,
  a body part being adapted to be received in a valve seat of said second casing part, and
  at least one spring part connecting said body part and said gasket part,
  wherein said body part is moveable in an airflow direction relative to said gasket part by bending or stretching said at least one spring part,
  wherein in an unbiased basic condition of said gasket device said body part is positioned above a gasket plane defined by said gasket chamber,
  wherein said gasket device is made as a single part of a flexible, elastic material,
 the first casing part comprising a first flange face and at least one first air flow channel, and
 the second casing part comprising a second flange face and at least one second air flow channel,
 wherein said at least one first air flow channel and said at least one second air flow channel are sealingly connected by said at least one gasket chamber of said gasket device,
 said gasket part of said gasket device being inserted into at least one groove of said first casing part and at least one groove of said second casing part, and
 said body part being pressed against the valve seat of the second casing part, thereby realizing a check valve,
 said check valve allowing an airflow in an airflow direction and blocking in the reverse direction
 wherein said pneumatic valve system is an air supply system for a use in a commercial vehicle, and
 wherein said first casing part is an adapter and said second casing part is a solenoid valve device comprising at least two solenoid valves.

7. The pneumatic valve system according to claim 6, wherein said pneumatic valve system is switchable between at least two modes, wherein said check valve is blocking in one mode and opening in the other mode.

8. The pneumatic valve system according to claim 6,
 wherein said gasket device provides a regeneration solenoid outlet, a solenoid inlet, at least one compressor solenoid outlet, and a solenoid exhaust channel, and
 wherein said check valve being realised at said regeneration solenoid outlet.

9. The pneumatic valve system according to claim 6,
 wherein the adapter comprises a dead end connection not sealed by the gasket device.

10. The pneumatic valve system according to claim 6, further comprising a third casing part housing at least one solenoid valve,
 said third casing part being mounted onto a back face of said adapter, and
 said second casing part being mounted onto a front face of said adapter, said gasket device being provided between said front face and said second casing part.

* * * * *